United States Patent
Teboulle (10) Patent No.: US 11,496,961 B2
(45) Date of Patent: Nov. 8, 2022

(54) GATEWAY SELECTION METHOD

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 17/606,966

(22) PCT Filed: Apr. 30, 2020

(86) PCT No.: PCT/EP2020/061990
§ 371 (c)(1),
(2) Date: Oct. 27, 2021

(87) PCT Pub. No.: WO2020/225075
PCT Pub. Date: Nov. 12, 2020

(65) Prior Publication Data
US 2022/0217627 A1  Jul. 7, 2022

(30) Foreign Application Priority Data
May 7, 2019 (FR) ........................... 1904745

(51) Int. Cl.
*H04W 48/20* (2009.01)
*H04W 40/10* (2009.01)
*H04W 40/32* (2009.01)

(52) U.S. Cl.
CPC ........... *H04W 48/20* (2013.01); *H04W 40/10* (2013.01); *H04W 40/32* (2013.01)

(58) Field of Classification Search
None
See application file for complete search history.

(56) References Cited

U.S. PATENT DOCUMENTS

| | | | |
|---|---|---|---|
| 2019/0069241 A1* | 2/2019 | Gilson | H04W 52/0241 |
| 2019/0280897 A1* | 9/2019 | Sennoun | H04L 12/2834 |

(Continued)

FOREIGN PATENT DOCUMENTS

| | | | |
|---|---|---|---|
| FR | 3 044 198 A1 | 5/2017 | |
| FR | 3 073 109 A1 | 5/2019 | |
| WO | WO-2018069284 A1 * | 4/2018 | H04B 7/15 |

OTHER PUBLICATIONS

Qadir, Qahhar Muhammad et al., "Low Power Wide Are Networks: A Survey of Enabling Technologies, Applications and Interoperability Needs", IEEE Access, vol. 6, 2018, pp. 77454-77473.

(Continued)

*Primary Examiner* — Brian S Roberts
(74) *Attorney, Agent, or Firm* — Oliff PLC (57) ABSTRACT

A method for selecting at least one gateway in a set of gateways for relaying data received from a server and intended for each endpoint in a group of endpoints, each endpoint in group communicating with the server via at least one gateway in the set of gateways, the group of endpoints and the set of gateways forming a LoRa network, each gateway receiving data intended for at least one endpoint retransmitting data to each endpoint for which data are intended in a frame in accordance with the LoRaWAN protocol. The method includes: selecting a subset of gateways of the set of gateways enabling the server to communicate with each endpoint group of minimum size, the selected subset minimising a risk of the data sent by the server and relayed by each gateway of subset being lost because of collisions between frames relaying data sent by the gateways of subset.

10 Claims, 4 Drawing Sheets

(56) References Cited

U.S. PATENT DOCUMENTS

2020/0127873 A1\* 4/2020 Teboulle ............. H04W 40/244
2021/0092738 A1\* 3/2021 Teboulle ................. H04L 47/24

OTHER PUBLICATIONS

Jun. 8, 2020 Search Report issued in International Patent Application No. PCT/EP2020/061990.

\* cited by examiner

GATEWAY SELECTION METHOD

TECHNICAL FIELD

The invention relates to a method for selecting gateways in a set of gateways, for relaying data received from a server and intended for each endpoint in a group of endpoints, each endpoint in said group communicating with the server via at least one gateway in the set of gateways, and a device implementing said method.

PRIOR ART

The internet is gradually transforming into a wide area network, referred to as the "Internet of Things", connecting all kinds of objects that have become connectable. New requirements in terms of networks have then appeared, and in particular requirements for wireless networks having greater coverage than conventional cellular networks and making it possible to limit energy consumption of the connected equipment. Among these long-range wireless networks allowing low energy consumption ("low power wide area network (LPWAN)"), mention can be made of networks based on the LoRa (registered trade mark) ("long range") technology. The LoRa technology operates on frequency bands known by the term "ISM (industrial, scientific and medical) band" comprising frequency bands that can be used freely for industrial, scientific and medical applications. The LoRa technology is based on a spread spectrum technology making it possible to obtain low-bitrate communications having good robustness in a particularly noisy ISM band.

A network based on LoRa technology (hereinafter referred to as "LoRa network") uses a protocol called LoRaWAN (LoRaWAN 1.1 Specification, final release, 11 Oct. 2017). A LoRa network is composed of base stations or gateways generally placed on high points in order to cover a large geographical area. The gateways are able to detect messages sent in their area by equipment or terminals ("endpoints") and to transfer them to at least one server ("LoRa network server (LNS)"), which will process them or retransmit them to one or more application servers.

In a conventional operation of a LoRa network, an endpoint wishing to transmit a message (i.e. data) to the server transmits this message in a frame, referred to as an uplink frame, in accordance with the LoRaWAN protocol. The uplink frame is transmitted in broadcast mode. This uplink frame is received by at least one gateway. Each gateway that has received the frame decodes it and retransmits the message to the server in an HTTP (HyperText Transfer Protocol) request. If several gateways have received the frame, the server receives several HTTP requests containing the message. The server must then designate, among the gateways that have received the uplink frame, the gateway to be used for relaying a response to the message contained in the uplink frame. The response is transmitted from the server to the designated gateway in an HTTP request, and then in unicast mode, from the designated gateway to the endpoint in a downlink frame in accordance with the LoRaWAN protocol. In a majority of implementations of LoRa networks, the designated gateway is the one offering the best quality of transmission with the endpoint that sent the uplink frame.

The LoRaWAN protocol defines three classes of transmission: classes A, B and C. Class A is the most economical in terms of energy consumption. When an endpoint has data to send, it does it without control since it opens two successive listening windows for any messages coming from the server. These two windows have recommended durations of 1 and then 2 seconds. These two windows are the only ones during which the server can send to the endpoint data that it has previously stored for its attention. Class A must be implemented in all the endpoints for reasons of compatibility.

Class B affords a good compromise between energy consumption and requirement for bidirectional communication. The endpoints operating in class B open reception windows at intervals programmed by periodic messages sent by the server.

Class C has the greatest energy consumption since the endpoints are permanently listening out, which makes it possible to make communications at all times.

It should be noted that an item of equipment can change class in the course of operation.

Recently, a change in the LoRaWAN protocol enabling a server to transmit downlink frames to a group of endpoints was defined in the document "LoRaWAN Remote Multicast Setup Specification, final release, Version 1.0.0, 10 Sep. 2018". The group of endpoints then forms a multicast group and a frame transmitted to a multicast group is then called a multicast frame. This development of the LoRaWAN protocol defines how to program a multicast distribution window for a multicast group of endpoints, how to ensure that the endpoints in said group temporarily move into class B or into class C at the start of this window, and how to close the multicast distribution window and return to a normal operation, for example in class A.

One problem underlying a transmission by a server of a multicast frame to endpoints forming a multicast group is that the server is liable to address all the gateways within range of the endpoints in the multicast group to transmit the multicast frame. Because of this, potentially, a plurality of gateways may relay the multicast frame at the same moment to the endpoints in the multicast group. There then exist high risks of collisions between the multicast frames relayed and that these collisions may be such that they cause losses of frames.

It is desirable to overcome these drawbacks of the prior art. It is in particular desirable to propose a method reducing the risk of frames being lost following collisions.

It is moreover desirable to propose a method that is simple to implement at low cost.

DISCLOSURE OF THE INVENTION

According to a first aspect of the present invention, the present invention relates to a method for selecting at least one gateway in a set of gateways for relaying data received from a server and intended for each endpoint in a group of endpoints, each endpoint in said group communicating with the server via at least one gateway in the set of gateways, the group of endpoints and the set of gateways forming a long-range wireless network affording low energy consumption, each gateway receiving data intended for at least one endpoint retransmitting said data to each endpoint for which said data are intended in a frame in accordance with a communication protocol adapted to said network. The method comprises a selection procedure comprising: obtaining, for each pair formed by an endpoint in said group and a gateway in the possible set of gateways, information, referred to as quality information, representing a quality of communication between said endpoint and said gateway; seeking at least one subset of gateways in the set of gateways which, in combination, enable the server to communicate with each endpoint in said group, each subset comprising a minimum number of gateways, referred to as the minimum number, necessary for the server to be able to communicate with each endpoint in said group; for each subset found, obtaining, from the quality information, a value of a metric representing a risk of the data sent by the server and relayed by each gateway in said subset being lost because of collisions between frames relaying said data sent by the gateway in said subset; selecting a subset according to the values of metrics obtained.

Using only one subset of gateways in the set of gateways makes it possible to reduce the risk of collision. Moreover, using such a metric makes it possible to reduce the risk of collisions causing data losses.

According to one embodiment, if at least one gateway in the set of gateways by itself alone enables the server to communicate with each endpoint in said group, the minimum number is equal to unity and, for each gateway enabling the server to communicate with each endpoint in said group, the method comprises: forming a subset containing said gateway; and associating said subset with the lowest value among the values of the quality information associated with the gateway in said subset; and selecting the subset associated with the highest quality value.

According to one embodiment, when the minimum number is equal to at least two, for each subset, obtaining the metric comprises: for each endpoint in said group, for each possible pair of gateways in said subset, calculating an absolute value of a difference, referred to as the absolute difference, between the quality information associated with said terminal and with a first gateway in the pair and the quality information associated with said terminal and with a second gateway in the pair; and associating said terminal with a value, referred to as the minimum absolute difference, corresponding to the minimum value of the absolute differences thus calculated; seeking the minimum value of the minimum absolute differences among the minimum absolute differences associated with the endpoints in the group of endpoints; and fixing the value of the metric associated with said subset at the minimum value of the minimum absolute differences found; the subset associated with the value of the highest metric being selected when the value of the metric is equal to at least a predefined threshold.

According to one embodiment, the selection procedure is iterative and is reiterated as long as no subset is selected, a sub-group of endpoints being eliminated from the group of terminals of the previous iteration at each new iteration following the first iteration.

According to one embodiment, each endpoint in the sub-group of endpoints is selected from the endpoints in the group of endpoints of the previous iteration having the poorest qualities of communication with the gateways in the set of gateways.

According to one embodiment, the long-range wireless network affording low energy consumption is a LoRa network and the communication protocol adapted to said network is the LoRaWAN protocol.

According to a second aspect of the invention, the invention relates to a method for transmitting data from a server to a group of endpoints, each endpoint in said group communicating with the server via at least one gateway in a set of gateways, the group of endpoints and the set of gateways forming a long-range wireless network affording low energy consumption, each gateway receiving data intended for at least one endpoint retransmitting said data to each endpoint for which said data are intended in a frame in accordance with a communication protocol adapted to said network. The method comprises: obtaining data to be transmitted to a group of endpoints; obtaining a subset of gateways in the set of gateways for relaying said data to the group of endpoints, said subset being obtained by implementing the method according to the first aspect; and transmitting said data to the endpoints in the group of endpoints via each gateway in the subset of gateways.

According to a third aspect of the invention, the invention relates to a device for selecting at least one gateway in a set of gateways for relaying data received from a server and intended for each endpoint in a group of endpoints; each endpoint in said group communicating with the server via at least one gateway in a set of gateways, the group of endpoints and the set of gateways forming a long-range wireless network affording low energy consumption, each gateway receiving data intended for at least one endpoint retransmitting said data to each endpoint for which said data are intended in a frame in accordance with a communication protocol adapted to said network. The device comprises: obtaining means for obtaining, for each pair formed by an endpoint in said group and a gateway in the possible set of gateways, information, referred to as quality information, representing a quality of communication between said endpoint and said gateway; seeking means for seeking at least one subset of gateways in the set of gateways which, in combination, enable the server to communicate with each endpoint in said group, each subset comprising a minimum number of gateways commonly referred to as the minimum number, necessary for the server to be able to communicate with each endpoint in said group; obtaining means for obtaining, from the quality information, for each subset found, a value of a metric representing a risk of the data sent by the server and relayed by each gateway in said subset being lost because of collisions between frames relaying said data sent by the gateway in said subset; determination means for determining the subset associated with the highest metric value; and selection means for selecting the subset determined if the value of the highest metric is at least equal to a predefined threshold.

According to a fourth aspect of the invention, the invention relates to equipment of the server type adapted for communicating with a group of endpoints via a set of gateways, the group of endpoints and the set of gateways forming a long-range wireless network affording low energy consumption, each gateway receiving data intended for at least one endpoint retransmitting said data to each endpoint for which said data are intended in a frame in accordance with a communication protocol adapted to said network. The equipment comprises: obtaining means for obtaining data to be transmitted to the group of endpoints; a device for selecting at least one gateway in the set of gateways according to the third aspect; and transmission means for transmitting said data to the endpoints in the group of endpoints via each selected gateway.

According to a fifth aspect of the invention, the invention relates to a computer program comprising instructions for implementing, by a device, the method according to the first aspect, when said program is executed by a processor of said device.

According to a sixth aspect, the invention relates to storage means storing a computer program comprising instructions for implementing, by a device, the method according to the first aspect, when said program is executed by a processor of said device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

The invention is described hereinafter in a context of a LoRa network wherein a server transmits one or more frames to a multicast group of endpoints. The invention applies however in other contexts for all types of long-range wireless network affording low energy consumption wherein a server transmits one or more frames to a group of endpoints, the frame or frames being able to be relayed by a plurality of gateways.

Figure 1:
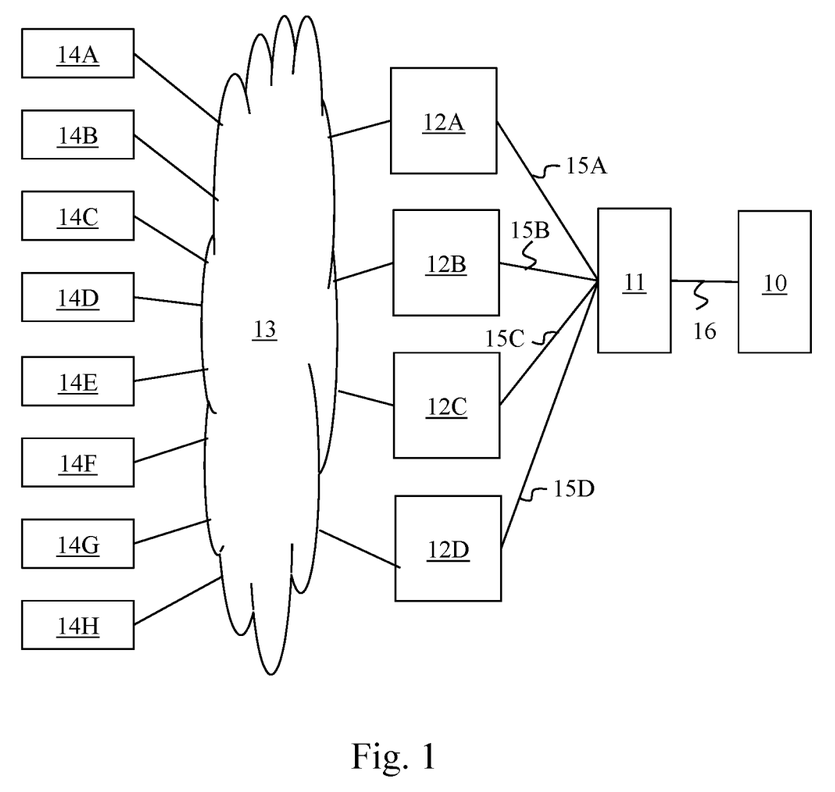
FIG. 1 illustrates schematically a LoRa network wherein the invention is implemented.

FIG. 1 illustrates schematically a LoRa network wherein the invention is implemented.

In the example in FIG. 1, the LoRa network comprises a set of gateways 12A, 12B, 12C and 12D and a set of endpoints comprising a plurality of endpoints 14A, 14B, 14C, 14D, 14E, 14F, 14G and 14H. Each gateway communicates with a server 11, referred to as an LNS server, by means of a cable or wireless communication link. For example, the gateway 12A (and respectively the gateway 12B, 12C and 12D) communicates with the LNS server 11 by means of a cable or wireless communication link 15A (and respectively 15B, 15C and 15D).

Each communication between a gateway and a terminal uses a wireless communication link 13. It should be noted that the communications over the wireless communication link 13 are in accordance with the LoRaWAN protocol.

The LNS server 11 is connected to one or more servers 10, referred to as application servers, by means of a cable or wireless communication link 16.

In the example in FIG. 1, the plurality of endpoints 14A, 14B, 14C, 14D, 14E, 14F, 14G and 14H forms a multicast group. This multicast group has for example been defined by the application server 10. It should be noted that, to simplify FIG. 1, the multicast group comprises only 8 endpoints. In a practical case, this multicast group could be composed of a large number of endpoints. For example, the multicast group could comprise 256, 512 or 1024 endpoints. Likewise, in FIG. 1, we have shown a set of gateways comprising 4 gateways. In a practical case, the number of gateways could be greater. The set of gateways could comprise around 100 gateways.

Figure 2:
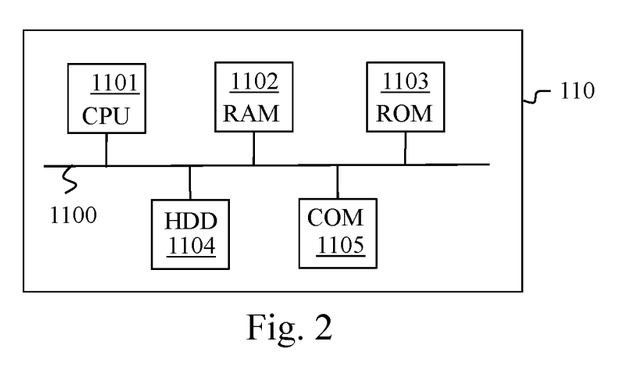
FIG. 2 illustrates schematically a processing module.

FIG. 2 illustrates schematically an example of hardware architecture of the processing module 110 included in the LNS server 11.

According to the example of hardware architecture shown in FIG. 2, the processing module 110 then comprises, connected by a communication bus 1100: a processor or CPU (central processing unit) 1101; a random access memory RAM 1102; a read only memory ROM 1103; a storage unit such as a hard disk or a storage medium reader, such as an SD (Secure Digital) card reader 1104; at least one communication interface 1105 enabling the processing module 110 to communicate with other devices such as the gateways 12A, 12B, 12C and 12D and the application server 10.

The processor 1101 is capable of executing instructions loaded in the RAM 1102 from the ROM 1103, from an external memory (not shown), from a storage medium (such as an SD card) or from a communication network. When the LNS server 11 is powered up, the processor 1101 is capable of reading instructions from the RAM 1102 and executing them. In one embodiment, these instructions form a computer program causing the complete or partial implementation, by the processor 1101, of the methods described hereinafter in relation to FIGS. 3, 4 and 5.

Figure 3:
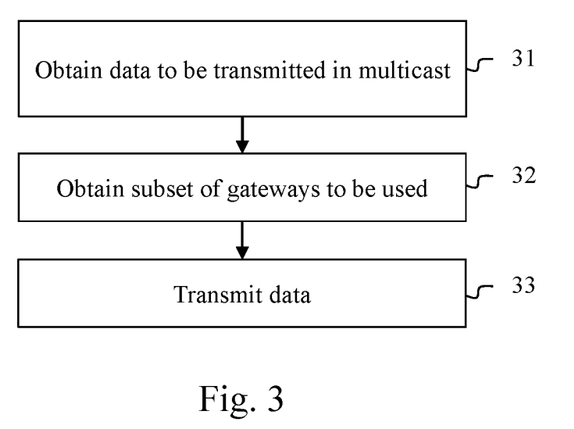
FIG. 3 illustrates schematically a method for transmitting, by a server, multicast frames to a multicast group of endpoints.

FIG. 3 illustrates schematically a method for transmitting, by a server, multicast frames intended for a multicast group of endpoints.

In a step 31, the processing module 110 of the LNS server 11 receives data to be transmitted to the multicast group formed by the endpoints 14A, 14B, 14C, 14D, 14E, 14F, 14G and 14H.

In a step 32, the processing module 110 obtains a subset of gateways of the set of gateways for relaying said data to the multicast group of endpoints. Said subset is obtained by implementing a selection method described below in relation to FIG. 4. A more detailed version of this method is described below in relation to FIG. 5.

In a step 33, the processing module 110 transmits said data to the endpoints in the group of endpoints via each gateway of the subset of gateways. Each gateway receiving these data forms and then transmits one or more multicast frames in accordance with the LoRaWAN protocol intended for the endpoints in the multicast group. By reducing the number of gateways used for relaying the data, i.e. not using all the gateways in the set of gateways, the risk of the collisions causing losses of multicast frames transporting these data is reduced. It is considered that, in the step 33, the endpoints in the multicast group of endpoints that operate in class A temporarily go into class B or into class C by implementing the methods described in the LoRaWAN protocol.

Figure 4:
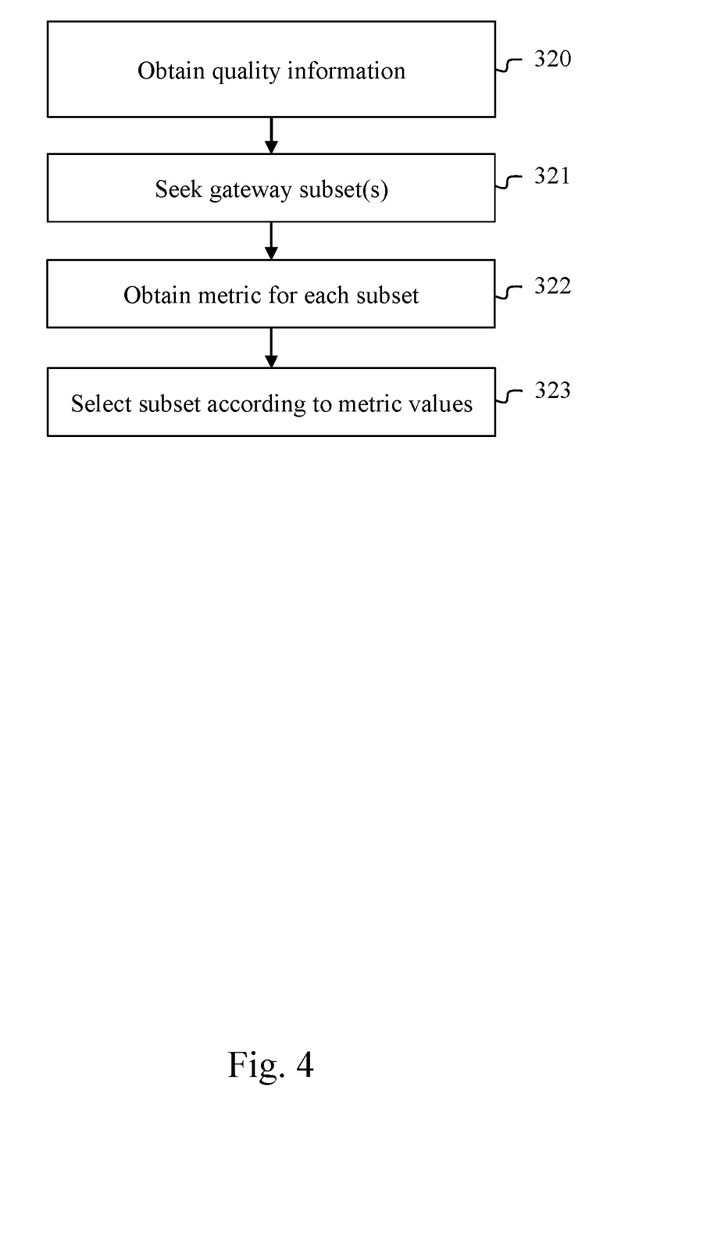
FIG. 4 illustrates schematically a high-level representation of a method for selecting at least one gateway for relaying a multicast frame.

FIG. 4 illustrates schematically a high-level representation of a method for selecting at least one gateway for relaying a multicast frame.

In one embodiment, this method is implemented by the processing module 110 of the LNS server 11. It could however be implemented by other servers connected to the LNS server 11, these servers providing a result of the implementation of this method to the LNS server 11. Moreover, in one embodiment, this method is implemented during the step 32. It could however be implemented at another moment, prior to the performance of the step 31, the step 32 consisting only of obtaining the result of implementation of said method.

In a step 320, for each pair formed by an endpoint of the multicast group and a gateway in the possible set of gateways, information IQ, referred to as quality information, representing a quality of communication between said endpoint and said gateway is obtained by the processing module 110. In one embodiment, for each pair formed by an endpoint of the multicast group and a gateway in the set of gateways, the quality information IQ is a value representing an RSSI (received signal strength indication) measured by said gateway when it receives an uplink frame in accordance with the LoRaWAN protocol, referred to as an uplink LoRa frame, from said endpoint. For example, the quality information IQ is the RSSI value measured when the last uplink LoRa frame is received or a mean of RSSI values. In one embodiment, the quality information IQ is shown in a two-dimensional table TAB. A first dimension of said table TAB represents the endpoints in the multicast group of endpoints. A second dimension represents the gateways in the set of gateways. When a gateway has never received a frame from an endpoint, for example when said gateway is not within range of said endpoint, the quality information IQ corresponding to the pair formed by this gateway and this endpoint is initialised to a predefined value IQ_MIN, for example equal to −1000 dBm.

In a step 321, the processing module 110 seeks at least one subset of gateways in the set of gateways which, in combination, enable the LNS server 11 to communicate with each endpoint in the multicast group of endpoints. Each subset comprises a minimum number of gateways N_MIN, referred to as a minimum number, necessary for the server to be able to communicate with each endpoint in said group. That is to say the minimum number N_MIN is the smallest possible, the minimum number N_MIN being at least equal to 1. When a subset of gateways comprises a minimum number N_MIN of gateways greater than 1, no gateway in said subset by itself enables the LNS server 11 to communicate with each endpoint in the multicast group of endpoints. On the other hand, for each endpoint in the multicast group of endpoints, the LNS server 11 is certain to find, among the N_MIN gateways in the subset of gateways, at least one gateway making it possible to communicate with said endpoint.

In a step 322, for each subset found, the processing module 110 obtains, from the quality information IQ, a value of a metric $\Delta_{RSSI}$ representing a risk of the data sent by the LNS server 11 and relayed by each gateway in the subset of gateways being lost because of collisions between frames relaying said data sent by the gateways in said subset of gateways. We describe an example of a metric $\Delta_{RSSI}$ below in relation to FIG. 5.

In a step 323, the processing module 110 selects a subset according to the metric values. In this selection, for example, the processing module 110 determines the subset associated with the highest metric value, denoted $\Delta_{RSSI}^{max}$, and selects the subset determined if the highest value of the metric $\Delta_{RSSI}^{max}$ is at least equal to a predefined threshold Th_$\Delta_{RSSI}$. In one embodiment, Th_$\Delta_{RSSI}$=5 dB.

Figure 5:
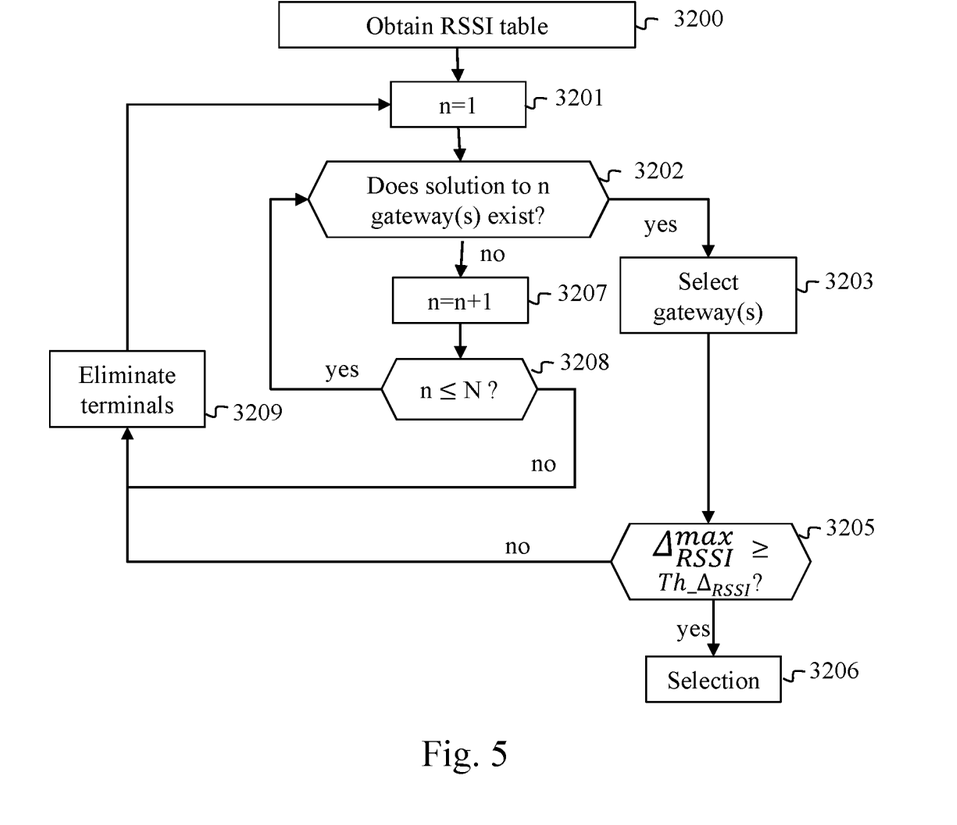
FIG. 5 illustrates schematically an example of a method for selecting at least one gateway for relaying a multicast frame.

FIG. 5 illustrates schematically an example of a method for selecting at least one gateway for relaying a multicast frame.

The method in FIG. 5 is an example of practical and detailed implementation of the method described in relation to FIG. 4.

In a step 3200 corresponding to the step 320, the processing module 110 obtains a table TAB comprising, for each pair formed by an endpoint in the multicast group of endpoints and a gateway in the set of gateways, quality information IQ.

In a step 3201, the processing module 110 initialises a variable n to unity. The variable n makes it possible to seek the value of the minimum number N_MIN.

In a step 3202, the processing module 110 determines whether there exists a subset of the set of gateways comprising n gateways which, in combination, enable the server to communicate with each endpoint in the multicast group of endpoints. When n=1, the processing module 110 seeks at least one gateway in the set of gateways which by itself enables the LNS server 11 to communicate with each endpoint in the multicast group of endpoints.

If there does not exist a subset of gateways comprising n gateways which, in combination, enable the server to communicate with each endpoint in the multicast group of endpoints, in a step 3207 the variable n is incremented by one unit. Thus the processing module 110 increases the size of the subsets of gateways.

In a step 3208, the processing module 110 compares the variable n with a predefined number N representing the maximum size of the subsets. If n≤N, the processing module 110 returns to the step 3202. Otherwise the step 3208 is followed by a step 3209.

If at least one subset of gateways comprising n gateways which, in combination, enable the server to communicate with each endpoint in the multicast group of endpoints exists, the step 3202 is followed by a step 3203.

When n=1, during the step 3202, the processing module 110 formed a subset comprising a gateway from each gateway by itself enabling the LNS server 11 to communicate with each endpoint in the multicast group of endpoints.

In the step 3203, for each subset of a gateway thus formed, the processing module 110 associates said subset with a value IQ_min corresponding to the lowest value among the values of the quality information IQ associated with the gateway contained in said subset. The processing module 110 next chooses the subset associated with the highest value IQ_min and fixes the value of the metric $\Delta_{RSSI}^{max}$ at the value of the predefined threshold Th_$\Delta_{RSSI}$ ($\Delta_{RSSI}^{max}$=Th_$\Delta_{RSSI}$).

In a step 3205, the processing module 110 compares the value of the metric $\Delta_{RSSI}^{max}$ with the predefined threshold Th_$\Delta_{RSSI}$. If $\Delta_{RSSI}^{max}$≥Th_$\Delta_{RSSI}$, the processing module 110 performs a step 3206 during which it selects the subset of gateways selected during the step 3203. However, since when n=1, $\Delta_{RSSI}^{max}$=Th_$\Delta_{RSSI}$, the subset selected in the step 3203, i.e. the subset associated with the highest value IQ_min is necessarily selected.

When n>1, in the step 3202 (i.e. no subset comprising a single gateway exists), the processing module 110 formed a subset comprising n gateways from each combination of n gateways in the set of gateways enabling the LNS server 11 to communicate with each terminal in the multicast group of terminals.

In the step 3203, for each subset thus formed, the processing module 110 calculates, for each endpoint of index i in the multicast group of endpoints and for each possible pair of gateways in said subset, said pair consisting of a gateway of index k and a gateway of index l, an absolute value of a difference referred to as an absolute difference, between quality information $IQ_{i,k}$ associated with the endpoint of index i and with the gateway of index k and quality information $IQ_{i,l}$ associated with the endpoint of index i and with the gateway of index l:

$$DA_{i,k,l}=|IQ_{i,k}-IQ_{i,l}|$$

Following the calculation of the absolute differences $DA_{i,k,l}$ for each subset thus formed, the processing module 110 determines, for each endpoint of index i, the minimum value of the absolute differences $DA_{i,k,l}$ thus calculated, referred to as a minimum absolute difference $DA_i^{min}$.

$$DA_i^{min}=\min_i{}^{\forall k, \forall l, k\neq l}(DA_{i,k,l})$$

where $\min_i{}^{\forall k, \forall l, k\neq l}(x_{i,k,l})$ is a function giving a minimum value of the $x_{i,k,l}$ values among all the possible values of $x_{i,k,l}$ of fixed index i and of indices k and l (k≠l) variable and taken from all the possible values of the indices k and l in the subset concerned. When n=2, i.e. when each subset comprises two gateways, for each subset and each endpoint, the processing module 110 calculates only one difference $DA_{i,k,l}$. In this case, the minimum absolute difference $DA_i^{min}=DA_{i,k,l}$.

There is then obtained, for each subset, a set of minimum absolute values $DA_i^{min}$, each endpoint in the multicast group of endpoints being associated with a minimum absolute value $DA_i^{min}$ for said subset.

Following the determination of the minimum absolute differences $DA_i^{min}$, for each subset thus formed, the processing module 110 seeks the minimum value of the minimum absolute differences among the minimum absolute differences associated with the endpoints in the group of endpoints.

For each subset, the processing module 110 fixes the value of the metric $\Delta_{RSSI}$ associated with said subset at the minimum value of the minimum absolute differences found.

$$\Delta_{RSSI}=\min{}^{\forall i}(DA_i^{min})$$

where $\min{}^{\forall i}(x_i)$ is a function giving a minimum value of the $x_i$ values among all the possible values of $x_i$ of variable index i taken from all the possible values of i. All the possible values of the index i is all the values of index i of the endpoints of the multicast group of endpoints.

During the step 3203, the processing module selects, from all the subsets, the subset associated with the value of the metric $\Delta_{RSSI}^{max}$ corresponding to the value of the highest metric $\Delta_{RSSI}$.

During the step 3205, the processing module 110 compares the value of the metric $\Delta_{RSSI}^{max}$ with the predefined threshold $Th\_\Delta_{RSSI}$. If $\Delta_{RSSI}^{max} \geq Th\_\Delta_{RSSI}$, the processing module 110 performs the step 3206 during which it selects the gateway subset selected during the step 3203. Otherwise the processing module 110 performs the step 3209.

During the step 3209, the processing module 110 eliminates a sub-group of endpoints in the multicast group of endpoints. In one embodiment, the sub-group of endpoints comprises a predefined number of endpoints and the endpoints in the sub-group of endpoints are selected randomly from the endpoints in the multicast group of endpoints. In another embodiment, the sub-group of endpoints comprises a predefined number of endpoints and the endpoints in the sub-group of endpoints are the endpoints in the multicast group of endpoints having the worst mean qualities of communication with the gateways in the set of gateways. In another embodiment, the sub-group of endpoints comprises a predefined number of endpoints and the endpoints in the sub-group of endpoints are the endpoints in the multicast group of endpoints associated with the lowest values $DA_i^{min}$ calculated during the step 3203.

The step 3209 is followed by the step 3201 already explained.

The selection method of FIG. 5 is therefore iterative and is iterated as long as no subset of gateways is selected.

In one embodiment, the predefined number N is fixed in order to limit a complexity of calculating the metric values $\Delta_{RSSI}$. This is because, the higher the value of n, the higher the number of possible pairs of gateways in a subset of gateways of size n and therefore the more complex becomes the calculation of the metric values $\Delta_{RSSI}$. In one embodiment, the predefined number N is fixed at 4.

In the embodiment in FIG. 5 described up until now, it is considered that the elimination of a sub-group of gateways can make it possible to result in a selection of a subset consisting of one gateway (i.e. n=1). For this reason, the step 3209 is followed by the step 3201, during which the processing module 110 repeats the method with n=1.

In another embodiment, following the step 3209, the processing module 110, in the step 3201, resumes at the last value of n tested. In this embodiment, it is considered that, if the current value of n has been reached, i.e. there does not exist any solution with a value of n below the current value of n, even by eliminating endpoints from the multicast group of endpoints. Thus, for example, if the processing module 110 performs the step 3209 while the value of n is equal to two, it repeats the step 3201 with a value of n equal to two.

In one embodiment, each value of n higher than unity is associated with a predefined maximum percentage of endpoints eliminated from the multicast group of endpoints during the step 3209. Thus, even if, when the step 3202 is performed, it is known that there exist subsets of n gateways in combination enabling the server to communicate with each endpoint in the multicast group of endpoints, if the percentage of endpoints eliminated from the multicast group of endpoints is higher than the predefined maximum percentage associated with the value of n, then the processing module 110 considers that there does not exist any possible subset of n gateways. For example, if the predefined number of N is equal to 4, the value n=2 is associated with the predefined maximum percentage 25%, the value n=3 is associated with the predefined maximum percentage 50% and the value n=4 is associated with the predefined maximum percentage 100%. For example, if, when the step 3209 is performed, a percentage of terminals eliminated from the multicast group of terminals greater than 25% is obtained, then the current value of n is equal to two, during the step 3201 following this step 3209 the processing module 110 fixes the value of n at three.

The invention claimed is:

1. A method for selecting at least one gateway in a set of gateways for relaying data received from a server and intended for each endpoint in a group of endpoints, each endpoint in said group communicating with the server via at least one gateway in the set of gateways, the group of endpoints and the set of gateways forming a long-range wireless network affording low energy consumption, each gateway receiving data intended for at least one endpoint retransmitting said data to each endpoint for which said data are intended in a frame in accordance with a communication protocol adapted to said network, wherein the method comprises a selection procedure comprising:

obtaining, for each pair formed by an endpoint in said group and a gateway in the possible set of gateways, information, referred to as quality information, representing a quality of communication between said endpoint and said gateway;

seeking at least one subset of gateways in the set of gateways which, in combination, enable the server to communicate with each endpoint in said group, each subset comprising a minimum number of gateways, referred to as the minimum number, necessary for the server to be able to communicate with each endpoint in said group;

for each subset found, obtaining, from the quality information, a value of a metric representing a risk of the data sent by the server and relayed by each gateway in said subset being lost because of collisions between frames relaying said data sent by the gateways in said subset; and selecting a subset according to the values of metrics obtained.

2. The method according to claim 1, wherein, if at least one gateway in the set of gateways by itself alone enables the server to communicate with each endpoint in said group, the minimum number is equal to unity and, for each gateway enabling the server to communicate with each endpoint in said group, the method comprises:

forming a subset containing said gateway; and
associating said subset with the lowest value among the values of the quality information associated with the gateway in said subset; and
selecting the subset associated with the highest quality value.

3. The method according to claim 1, wherein, when the minimum number is equal to at least two, for each subset, obtaining the metric comprises:

for each endpoint in said group, for each possible pair of gateways in said subset, calculating an absolute value of a difference, referred to as the absolute difference, between the quality information associated with said terminal and with a first gateway in the pair and the quality information associated with said terminal and with a second gateway in the pair; and associating said terminal with a value, referred to as the minimum absolute difference, corresponding to the minimum value of the absolute differences thus calculated;
seeking the minimum value of the minimum absolute differences among the minimum absolute differences associated with the endpoints in the group of endpoints; and
fixing the value of the metric associated with said subset at the minimum value of the minimum absolute differences found;
the subset associated with the value of the highest metric being selected when the value of the metric is equal to at least a predefined threshold.

4. The method according to claim 1, wherein the selection procedure is iterative and is reiterated as long as no subset is selected, a sub-group of endpoints being eliminated from the group of terminals of the previous iteration at each new iteration following the first iteration.

5. The method according to claim 1, wherein each endpoint in the sub-group of endpoints is selected from the endpoints in the group of endpoints of the previous iteration having the poorest qualities of communication with the gateways in the set of gateways.

6. The method according to claim 1, wherein the long-range wireless network affording low energy consumption is a LoRa network and the communication protocol adapted to said network is the LoRaWAN protocol.

7. The method for transmitting data from a server to a group of endpoints, each endpoint in said group communicating with the server via at least one gateway in a set of gateways, the group of endpoints and the set of gateways forming a long-range wireless network affording low energy consumption, each gateway receiving data intended for at least one endpoint retransmitting said data to each endpoint for which said data are intended in a frame in accordance with a communication protocol adapted to said network, wherein the method comprises:

obtaining data to be transmitted to a group of endpoints;
obtaining a subset of gateways in the set of gateways for relaying said data to the group of endpoints, said subset being obtained by implementing the method according to claim 1; and
transmitting said data to the endpoints in the group of endpoints via each gateway in the subset of gateways.

8. A non-transitory storage medium comprising instructions for implementing, by a device, the method according claim 1, when said instructions are executed by a processor of said device.

9. A device for selecting at least one gateway in a set of gateways for relaying data received from a server and intended for each endpoint in a group of endpoints, each endpoint in said group communicating with the server via at least one gateway in the set of gateways, the group of endpoints and the set of gateways forming a long-range wireless network affording low energy consumption, each gateway receiving data intended for at least one endpoint retransmitting said data to each endpoint for which said data are intended in a frame in accordance with a communication protocol adapted to said network, wherein the device comprises a processor configured to:

obtain, for each pair formed by an endpoint in said group and a gateway in the possible set of gateways, information, referred to as quality information, representing a quality of communication between said endpoint and said gateway;
seek at least one subset of gateways in the set of gateways which, in combination, enable the server to communicate with each endpoint in said group, each subset comprising a minimum number of gateways commonly referred to as the minimum number, necessary for the server to be able to communicate with each endpoint in said group;
for each subset found, obtain, from the quality information, a value of a metric representing a risk of the data sent by the server and relayed by each gateway in said subset being lost because of collisions between frames relaying said data sent by the gateways in said subset; and
select a subset according to the values of metrics obtained.

10. Equipment of the server type adapted for communicating with a group of endpoints via a set of gateways, the group of endpoints and the set of gateways forming a long-range wireless network affording low energy consumption, each gateway receiving data intended for at least one endpoint retransmitting said data to each endpoint for which said data are intended in a frame in accordance with a communication protocol adapted to said network, wherein the equipment comprises:

a processor configured to obtain data to be transmitted to the group of endpoints;
a device for selecting at least one gateway in the set of gateways according to claim 9; and
wherein the processor is further configured to transmit said data to the endpoints in the group of endpoints via each selected gateway.

* * * * *